United States Patent [19]
Legris

[11] 3,934,605
[45] Jan. 27, 1976

[54] MODULAR DISTRIBUTOR BOX FOR FLUIDS

[75] Inventor: André Legris, St-Maur, France

[73] Assignee: Societe Legris France S.A., Ozoir-la-Ferriere, France

[22] Filed: June 28, 1974

[21] Appl. No.: 484,244

[30] Foreign Application Priority Data
July 3, 1973 France .............................. 73.24472

[52] U.S. Cl............... 137/271; 137/561 R; 285/325
[51] Int. Cl.² ...................... F15C 4/00; F16L 23/00
[58] Field of Search........ 137/608, 561 R, 269, 271; 285/12, 325, 137 R, 330

[56] References Cited
UNITED STATES PATENTS

| | | | |
|---|---|---|---|
| 1,482,772 | 2/1924 | Tschirgi .............................. | 285/325 |
| 3,429,343 | 2/1969 | Steiro ............................... | 285/330 X |
| 3,506,029 | 4/1970 | Demler, Sr. et al. ............. | 137/561 R |
| 3,509,904 | 5/1970 | Olson ................................ | 137/608 X |
| 3,512,553 | 5/1970 | Legris ................................ | 137/271 |
| 3,589,387 | 6/1971 | Raymond ........................ | 137/608 X |
| 3,707,989 | 1/1973 | Davin ................................ | 137/608 |
| 3,756,274 | 9/1973 | Wolfgram ...................... | 137/271 X |
| 3,760,842 | 9/1973 | Mikiya ............................. | 137/561 R |

FOREIGN PATENTS OR APPLICATIONS
1,206,828   9/1970   United Kingdom................. 137/608

*Primary Examiner*—William R. Cline
*Attorney, Agent, or Firm*—Brooks Haidt Haffner & Delahunty

[57] ABSTRACT

A modular distributor box for distributing a fluid, consisting of a linear assembly of juxtaposed prismatic modules with contiguous modules connected together by engagement of a projection having an undercut, preferably dovetail, cross-section of one module engaging with one of at least two similarly undercut intersecting grooves of a corresponding face of the next module, each module having a central conduit therethrough between the faces on which the grooves and projections are defined so that the assembled distributor box has a continuous longitudinal conduit extending therethrough. The ends of the box may be blanked off with releaseable plugs. Transverse conduits formed in the various modules of the distributor box may include pressure sensors, manometers branching pipes or blanking plugs, and at least one of the modules may include a shut off tap effective to close said central conduit.

13 Claims, 11 Drawing Figures

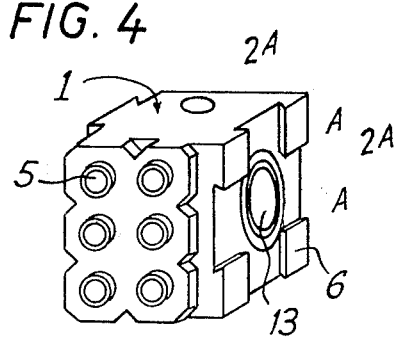
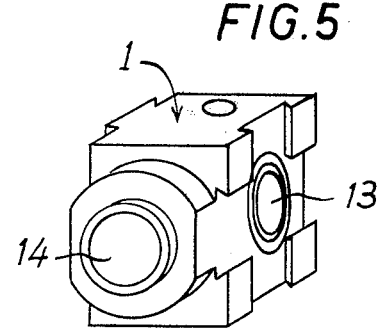
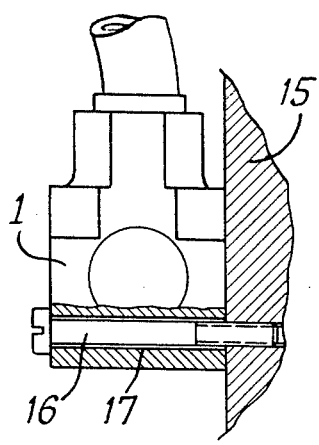
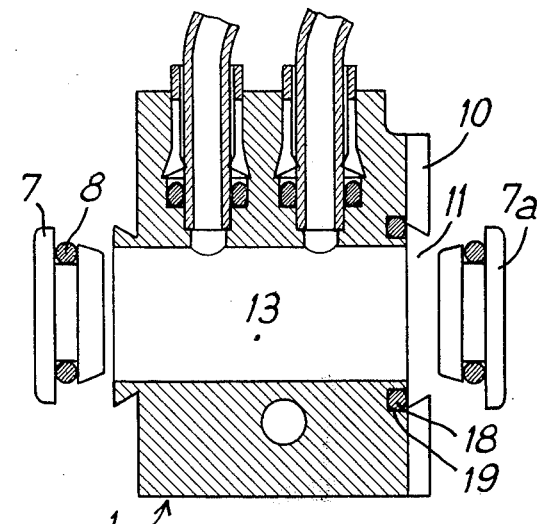
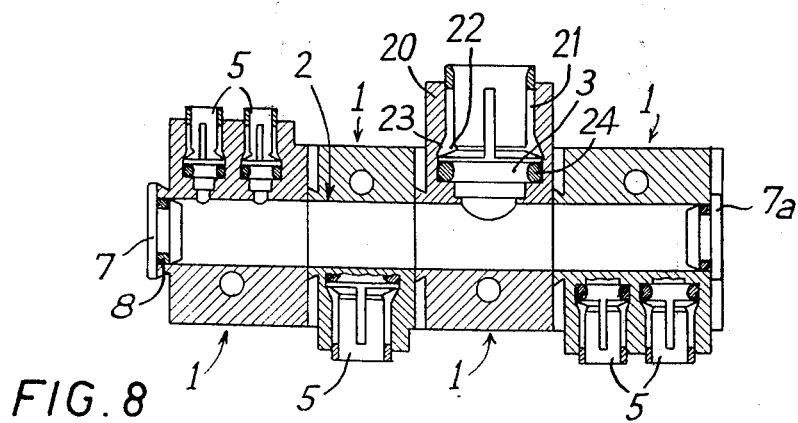

MODULAR DISTRIBUTOR BOX FOR FLUIDS

The present invention relates to a distributor box for the distribution of fluids.

Distribution boxes or junction boxes comprising a main conduit of large size and branch conduits of smaller size are utilised for distributing a fluid coming from a main supply conduit to apparatus of smaller size.

Such apparatus, which is well known in the industry for distributing any fluid, is often formed of a pipe to which the outlet conduits are connected by soldering or brazing. Such known apparatus, which are manufactured to order, is very costly and not very practical.

In order to simplify the manufacture and construction thereof such apparatus has, in the past, been produced by an assembly of juxtaposed modular elements.

For assembling modular elements, it is known to use threaded studs each provided with a tightening nut at its end. However, such a mode of assembling is not very practical since the user is forced to cut the threaded studs in order to make them of an appropriate length.

Moreover, it is necessary subsequently to mount connectors on the junction box so as to secure the pipes. This arrangement is still costly because of the need to provide tapped holes and to mount the connectors.

For assembling the elements of a distributor box, dovetail cross-sectioned members associated with gaskets have also been used.

The distribution of fluids through main lines comprising an assembly of elements formed by members in dovetail form is also known from U.S. Pat. No. 3,512,553.

However, these modes of assembling do not permit the mounting of elements to be effected with various orientations so as to permit orientations of the outlet conduits as required.

Junction boxes which are formed of connector bodies of the so-called banjo union type and which are assembled by a central hollow screw in such manner that the said bodies are orientable are known, but the number of banjo connectors is always the same for a single central screw and this limits the possibilities of utilisation.

The present invention relates to a modular distributor box which enables the various drawbacks of the existing devices to be obviated.

According to one aspect of the present invention there is provided a modular distributor box for distributing a fluid, which comprises a linear assembly of juxtaposed prismatic modules having a longitudinal conduit into which at least one transverse feed conduit and transverse outlet conduits open, each module having on two opposite faces assembly means which are, on one face, formed by several intersecting grooves and on the other face, formed by a projection of co-operating cross-section to enable a projection of a contiguous element to be selectively engaged in the grooves, each module further including a central conduit extending between and opening into said opposed faces to serve as a part of said longitudinal conduit of the assembled distributor box.

According to a further aspect of the invention there is also provided a module for a distributor box comprising a prismatic module body having opposite faces into which open the ends of a central conduit extending through the body, at least one undercut projection formed on and bisecting one of the opposite faces, and at least two grooves bisecting the other of the opposite faces and having a cross-section conforming to that of the projection.

The device according to the invention enables the user to form junction boxes without the aid of a special tool and without a screw member.

By virtue of utilising rapid connectors on the outlet and inlet conduits, more particularly of the kind which are the subject of U.S. Pat. No. 3,653,689 the mounting of the tubes is effected in instantaneous manner and without the aid of any threaded devices.

The device according to the invention enables each module and the outlet conduits to be oriented in several directions.

Since the modules may contain outlet conduits of different diameters, they permit great ease of utilisation and production.

Every module comprises a means for easily securing it to another module which enables it to be used alone or in a group.

The supply to the main conduit, which is preferably closed by plugs at both ends, can be effected at any point of the distributor box and this supply may comprise one or more conduits.

For the purpose of controlling the pressure in the distributor box, it is possible to replace one of the pipes mounted on an outlet conduit by a pressure sensor or other measuring instrument.

Such a distributor box comprises several modules can readily be secured to a flat surface, or in a corner of a casing containing a pneumatic circuit.

Other characteristics and advantages of the present invention will become better understood from reading the following description of a number of exemplary embodiments and by referring to the accompanying drawings in which:

FIG. 4 is a perspective view of a module having a plurality of outlet ducts;

FIG. 5 is a perspective view of a module having a single outlet or inlet duct;

FIG. 6 is an elevational, partly sectional, view of the mounting of an element on a flat wall;

FIG. 7 is a sectional view of one module;

FIG. 8 is a sectional view of an assembly of a plurality of modules forming a distributor box;

Figure 1:
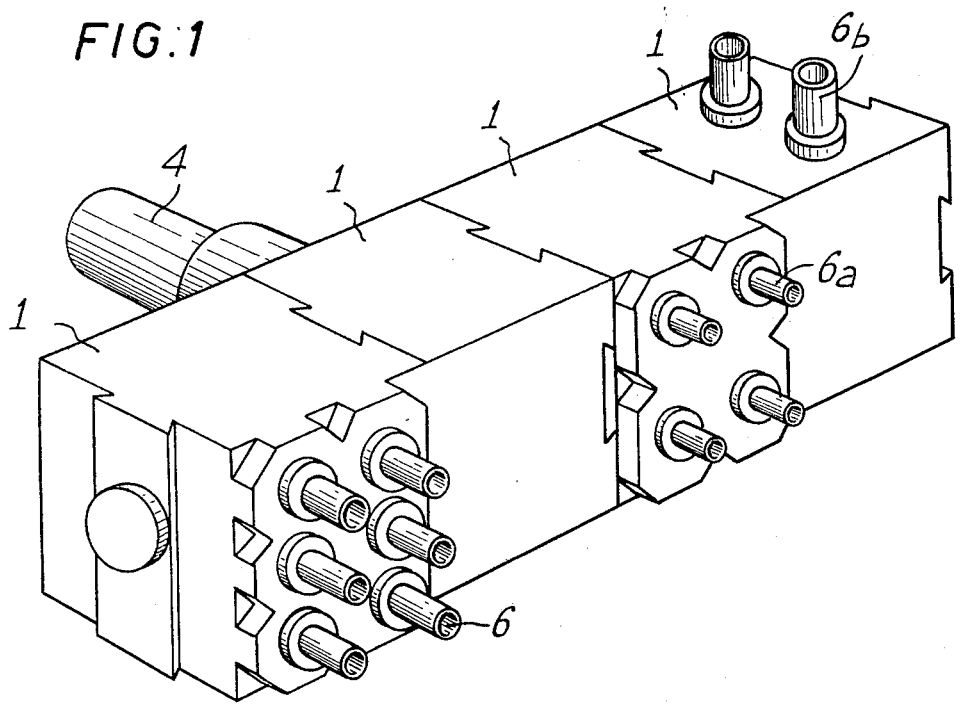
FIG. 1 is a perspective view of a distributor box produced according to the invention.
Figure 2:
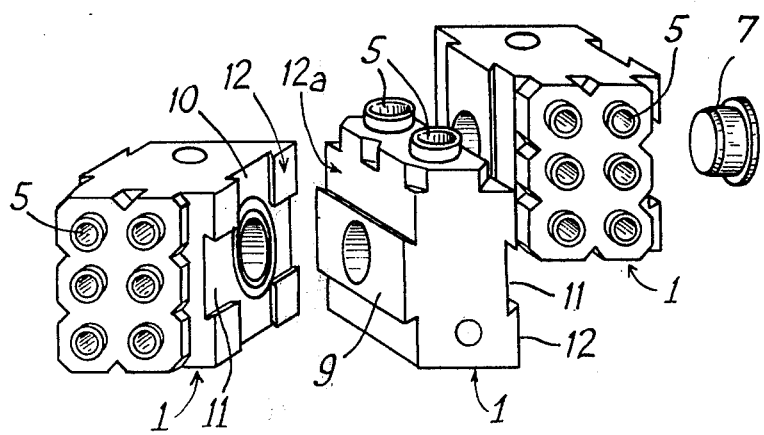
FIG. 2 is a perspective view showing the mode of assembling several modules.

In FIGS. 1, 2 and 8 there is shown a distributor box according to the invention comprising a plurality of rectangular parallelepipedonal modules 1 linearly assembled by juxtaposition and having a longitudinal conduit 2 into which opens at least one transverse supply conduit 3 to which a feed pipe 4 is connected. Transverse outlet conduits 5, to which pipes 6, 6a and 6b are connected, also open into the conduit 2.

As will be apparent from FIG. 1, the modules are capable of being oriented in various directions such that the tubes 6 and 6a are oriented in one direction and the tubes 6b in a different direction.

The longitudinal conduit 2 (FIG. 8) is closed at its ends by plugs 7, 7a provided with gaskets 8 and threadedly engaged in the two end modules 1.

Each module 1 has on two opposite faces 12, 12a, assembly means comprising on one face 12a, a dovetail cross-section rib or projection 9 and, on the other face 12, two dovetail cross-sectioned grooves 10 and 11 which intersect at a right angle. The projection 9 of each module is adapted to be selectively engaged in either of the grooves 10 and 11 of the contiguous module in such manner that the conduits 5 can be oriented in four directions according to whether the male member or projection 9 is engaged in the groove 10 or 11.

The bearing surface of the faces 12, 12a is square and has sides of length 2A, A being the distance between the axis of a groove 10 or 11 or of a projection 9 and one of the edges defining said faces. In this manner the modules 1 can be differently oriented according to the desired assembly while maintaining the contact between the surfaces.

Each module, as shown in FIGS. 4 and 5, contains a central conduit 13 into which open a plurality of, in this case six, outlet conduits 5. In FIG. 5 the module 1 comprises only a single conduit 14 which opens into the central conduit 13, the said conduit 14 being capable of forming either an inlet conduit or an outlet conduit. The modules 1 can be mounted on a flat surface 15 (FIG. 6) by means of bolts engaged in a bore 17 provided in the element 1.

As shown in FIG. 7 it is possible to utilise a single module 1 which is, at its two ends, provided with plugs 7, 7a inserted into the ends of the central conduit 13. The seal at the side of the grooves 10 and 11 is ensured by an O-ring 18 disposed in a circular groove 19 surrounding the opening of the central conduit 13.

The inlet conduits 3 and outlet conduits 5 are provided with rapid connectors of the kind described in U.S. Pat. No. 3,653,689 enabling smooth tubes to be connected to a module. The connector comprises a ring 20 (FIG. 8) integral with the module 1 and internally receiving a flexible clamp 21 having a plurality of jaws 22 adapted to be engaged in the wall of a tube to be connected, the said ring 20 having in its bore a divergent zone 23 for gripping the jaws of the clamp 21. Sealing is ensured by an elastomeric O-ring 24 placed in a groove of the element.

Figure 3:
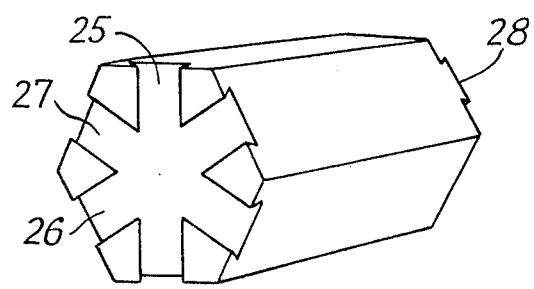
FIG. 3 is a perspective view of a modified embodiment of a module having a plurality of grooves.

Although in FIGS. 1 and 2 modules comprising only two perpendicularly intersecting grooves 10, 11 have been shown, it is clear that prismatic elements comprising a plurality of dovetail section grooves on an assembly face could be used. For example, as shown in FIG. 3, three grooves 25, 26, 27 may be provided in which a projection 28 of a contiguous element to be assembled can be engaged.

Figure 9:
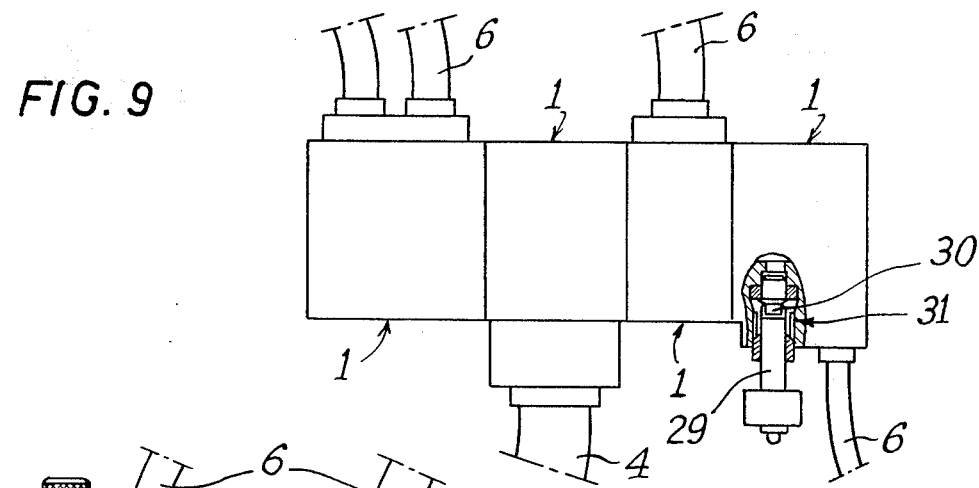
FIG. 9 is a view of a distributor box comprising a pressure sensor.

In FIG. 9 there is shown a distributor box comprising several modules 1 and wherein one of the outlet tubes has been replaced by a pressure sensor 29 having a grooved tip 30 enabling it to be engaged in a rapid connector 31. This arrangement enables the presence of fluid such as compressed air in the distributor box to be checked.

Figure 10:
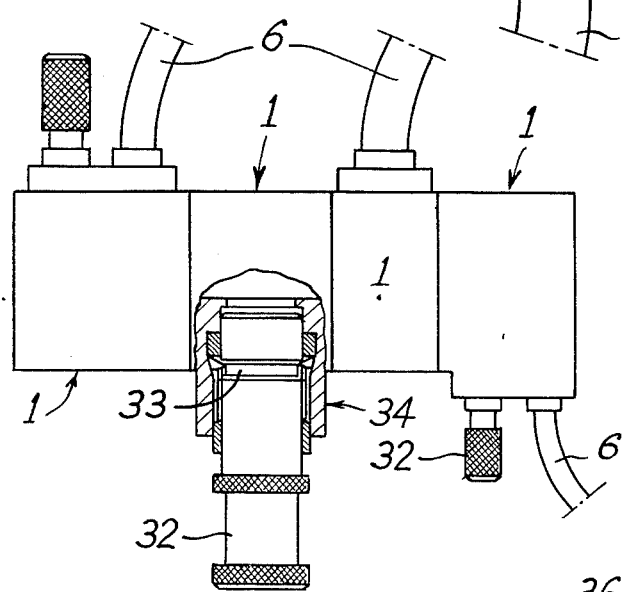
FIG. 10 is a view of a distributor box comprising removable plugs mounted in the outlet ducts.

In certain cases it may be necessary to close off certain of the outlet ducts 5 and to this end it is envisioned that the tubes 6 or 4 may be replaced by removable plugs 32 (FIG. 10) which have a grooved tip 33 whereby they may be engaged in a rapid connector 34.

Finally, it may be necessary to measure the internal pressure in the distributor box and it is possible to mount a manometer provided with a grooved tip in one of the outlet ducts 5.

Figure 11:
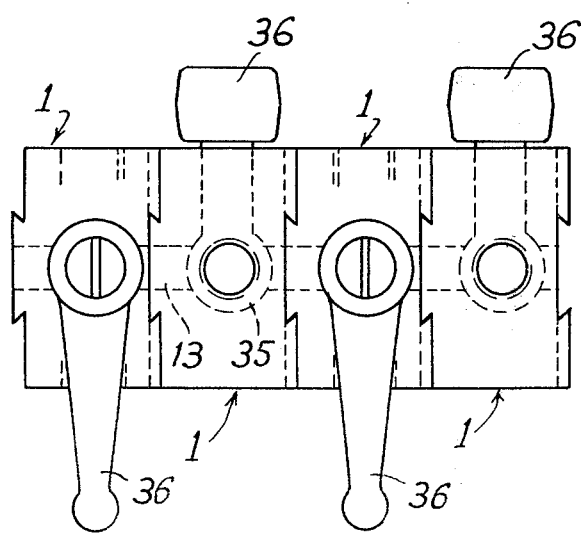
FIG. 11 is a view of a distributor box equipped with taps or cocks.

FIG. 11 shows a further embodiment of a distributor box comprising modules 1 and having its central conduit 13 adapted to be closed by a domed tap or cock 35 mounted on each module and operated from outside by a key 36.

Although the grooves and projection of the modules exemplified above are of dovetail cross-section, they may instead be of any suitable undercut cross-section such as a T-section, which will enable the grooves to receive the projections by longitudinal sliding action but will retain the projections against lateral withdrawal.

I claim:

1. A modular distributor box for distributing a fluid, comprising a linear assembly of a plurality of juxtaposed modules, each said module having:
   a. a prismatic module body having a pair of oppositely facing faces and further faces extending transversely to and between said opposite faces;
   b. said body having a central bore, the wall of said bore defining a central conduit extending through said module body from the center of one of said oppositely facing faces to the center of the other of said oppositely facing faces and being open at its ends at said oppositely facing faces;
   c. said body having at least two relatively long and narrow intersecting grooves of identical cross-section formed in one of said oppositely facing faces, each of said grooves increasing in width in the direction inwardly of said body from the oppositely facing face in which it is formed and the intersection of said grooves being at the open end of said conduit at said last-mentioned face;
   d. said body having a projection extending from the other of said oppositely facing faces and having a cross-section conforming to that of each groove whereby said projection may be inserted in and interlock with either of said grooves thereby permitting one module to be secured to another module in at least two different relative positions; and
   said modules being interconnected by engagement of a projection on one of the modules with one of the grooves of a contiguous module with the central conduit of one module in register with the central conduit of said contiguous module to form a longitudinal conduit extending along said distributor box, and the body of at least one of said modules also having at least one passageway therein extending from one of said further faces of said last-mentioned body to said central conduit thereof to form a transverse conduit.

2. A modular distributor box as set forth in claim 1, wherein each said module body is of rectangular parallelepipedonal form, wherein said grooves are of dovetail cross-section, and wherein said projection is of a corresponding dovetail cross-section.

3. A modular distributor box as set forth in claim 2, wherein said oppositely facing faces are square and the grooves and projections bisect the respective square faces.

4. A modular distributor box as set forth in claim 1, and including plug means closing the ends of said longitudinal conduit through the distributor box, said plug means being engaged in an end of said central conduit of each end module; and O-ring means carried by said plug means.

5. A modular distributor box as set forth in claim 1, and including a tap in the central conduit of at least one of said modules, said tap being constructed to close said central conduit of at least said last-mentioned one module.

6. A modular distributor box as set forth in claim 1, and including at each said oppositely facing face of each module having a groove therein, an O-ring seal means located in said groove and surrounding the open end of said central conduit thereat.

7. A modular distributor box as set forth in claim 1, and including an elongate securing member for mounting each module on a flat surface, said body having an opening extending through the module body from one of said further faces to another thereof for receiving said securing member.

8. A modular distributor box as set forth in claim 1, further comprising fluid line receiving means at the end of said transverse conduit at said one further face, said fluid line receiving means comprising sleeve means in said transverse conduit, flexible clamp means including a plurality of jaws and located within said sleeve means, said sleeve means having an interior divergent zone for gripping the jaws of said clamp means, and O-ring seal means located within said sleeve for surrounding said fluid line.

9. A modular distributor box as set forth in claim 8, and including a pressure sensor extending from and secured to at least one of said modules by said receiving means.

10. A modular distributor box as set forth in claim 8, and including a plug secured to at least one of said modules by said receiving means.

11. A module for a distributor box for distributing a fluid, said module comprising:

a. a prismatic module body having a pair of oppositely facing faces and further faces extending transversely to and between said opposite faces;
b. said body having a central bore, the wall of said bore defining a central conduit extending through said module body from the center of one of said oppositely facing faces to the center of the other of said oppositely facing faces and being open at its ends at said oppositely facing faces;
c. said body having at least two relatively long and narrow intersecting grooves of identical cross-section formed in one of said oppositely facing faces, each of said grooves increasing in width in the direction inwardly of said body from the oppositely facing face in which it is formed and the intersection of said grooves being at the open end of said conduit at said last-mentioned face;
d. said body having a projection extending from the other of said oppositely facing faces and having a cross-section conforming to that of each groove whereby said projection may be inserted in and interlock with either of said grooves thereby permitting one module to be secured to another similar module in at least two different relative positions with the central conduit of said one module aligned with the central conduit of said other module; and
e. said body also having at least one passageway therein extending inwardly of said body from one of said faces thereof to form a further conduit.

12. A module as set forth in claim 11, wherein said prismatic body is hexagonal in a cross-section parallel to said oppositely facing faces and said other oppositely facing face has three dovetail grooves therein intersecting at 60°, said projection having a conforming dovetail cross-section.

13. A module as set forth in claim 11, and wherein said further conduit is a transverse conduit extending from one of said further faces to and communicating with said central conduit.

* * * * *